United States Patent [19]
Sarnoff et al.

[11] Patent Number: 5,310,981
[45] Date of Patent: May 10, 1994

[54] MICROWAVE COOKER

[75] Inventors: Norton Sarnoff, Northbrook; Carl Fletcher, Kildeer; Laura Giese, Oak Park; John Chmela, Mount Prospect, all of Ill.

[73] Assignee: Ensar Corporation, Wheeling, Ill.

[21] Appl. No.: 96,713

[22] Filed: Jul. 23, 1993

[51] Int. Cl.⁵ .............................................. H05B 6/80
[52] U.S. Cl. ..................................... 219/731; 99/451; 99/DIG. 14; 126/369; 220/366; 219/735
[58] Field of Search ................. 219/10.55 E, 10.55 F, 219/10.55 R, 431, 440; 99/DIG. 14, 451; 126/348, 369; 220/366, 367; 426/241, 243

[56] References Cited
U.S. PATENT DOCUMENTS

| | | | |
|---|---|---|---|
| 4,331,251 | 5/1982 | Berman et al. | 220/320 |
| 4,705,927 | 11/1987 | Levendusky et al. | 219/10.55 E |
| 4,796,776 | 1/1989 | Dalquist et al. | 220/319 |
| 4,839,484 | 6/1989 | Senba | 219/10.55 E |
| 4,853,509 | 8/1989 | Murakami | 219/10.55 E |
| 4,952,765 | 8/1990 | Toyosawa | 219/10.55 E |
| 5,019,680 | 5/1991 | Morino et al. | 219/10.55 E |
| 5,092,229 | 3/1992 | Chen | 99/337 |

Primary Examiner—Philip H. Leung
Attorney, Agent, or Firm—Lee, Mann, Smith, McWilliams, Sweeney & Ohlson

[57] ABSTRACT

A microwave cooker capable of cooking an assortment of foods by a variety of methods while maintaining constant pressure. The cooker of the present invention boils and steams foods continuously without pressure build up and without the need to shut off the microwave oven. Food spattering and spillage are prevented by a unique internal baffle rib design and a mechanism that releaseably locks the top cover.

9 Claims, 3 Drawing Sheets

MICROWAVE COOKER

BACKGROUND OF INVENTION

1. Field of Invention

This invention is generally related to microwave cooking devices and is specifically directed to a microwave cooker that cooks food at a constant pressure while minimizing oven clean up.

2. Description of Prior Art

Conventional cooking methods are often duplicated in a microwave oven. Just as in stove top cooking, steaming and boiling food in the microwave requires careful monitoring in order to avoid spattering or spilling food. Loss of food during preparation effects the outcome of the recipe and makes clean up burdensome. Moreover, regulating pressure build up inside a microwave cooker during the boiling or steaming process is critical to avoid an explosion.

A wide assortment of cookers boil and steam heat food inside the microwave oven. Some have a complex structure, others are simple. Yet, no cooker continuously alleviates pressure build up inside the food chamber while at the same time minimizing the mess created by boiling foods.

For example, U.S. Pat. No. 4,705,927 presents a microwave cooker designed specifically to steam heat food. This device features a separate water absorbing member to generate steam. The member controls heat distribution and reduces cooking time. However, pressure build up is not continuously released from the food container, or does the cooker obstruct food from splattering or pouring over into the oven.

The device of U.S. Pat. No. 4,839,484 boils rice in a microwave oven. The cooker employs an open bowl inverted and positioned at the bottom of another bowl. The inverted bowl contains slits that circulate water. During the cooking process, the water must be periodically discharged and new water added. A lid supporter prevents overflow and scattering of boiling water within the food container. However, pressure is not adjusted, nor pressure build up alleviated, without shutting off the oven. Also, this cooker does not have a lid enclosure which prevents food from overflowing into the oven.

Similarly, U.S. Pat. No. 4,271,344 is directed to cooking and softening foods, without dehydration or loss of moisture content. A heating chamber contains a plate having a plurality of apertures in a predetermined pattern for the passage of vapor. The plate is designed to obstruct food from projecting above a liquid level. The cooker further contains a shield lid made of metallic material causing a portion of the high frequency electromagnetic waves to be reflected before reaching the food. However, nothing is offered to equalize pressure.

Microwave cookers of simple construction, without special designed implements or separate compartments, also lack the necessary mechanisms that relieve pressure build up and prevent food spattering and spillage. For example, U.S. Pat. No. 4,478,349 is an uncomplicated device to heat and cook both food and beverages in a microwave oven. This microwave cooker features an insulated dish having a double walled vessel construction and lid. An air cavity separates a removable inner container from an outer container of similar shape. A flange and rim assembly support the inner container and allow pressure to escape from the air cavity. However, nothing relieves pressure build up within the inner chamber containing the food. Moreover, no implement ensures that the lid stays closed and the food stays inside the dish.

Likewise, U.S. Pat. No. 4,952,765 offers a microwave cooker comprising a container for holding food, an outside lid and an inside cover. This cooker features an inside lid which shuts off vent holes during the microwave heating, deliberately halting any dispensation or flow of vapor from the container. Although simple to manufacture and use, the cooker does not release pressure build up until the microwave oven is turned off.

Hence, a need exists for a microwave cooker of simple construction that relieves pressure build up during continuous microwave processing while impeding the spattering of food throughout the microwave oven.

SUMMARY OF THE INVENTION

The present invention is a microwave cooker comprising a cooking container member adapted to hold food to be cooked, an inner lid inserted into the open top of the container member, a top cover which overlies and covers the inner lid, and a means for releaseably locking the top cover.

The cooking container member has at least one sidewall and open top. An inner lid is adapted to fit within the open top of the cooking container member. The inner lid has at least one vent hole and at least one upwardly extending baffle rib to capture of food particles discharging with food vapors. The upwardly extending baffle rib of the inner lid contains a gap for vapor flow in and around the rib. The inner lid is removable from the container member, but remains in a fixed position during microwave cooking.

The top cover is positioned over the inner lid and comprises a vent hole and at least one downwardly extending baffle rib. The baffle ribs of the inner lid and of the top cover are in a spaced relationship. The top cover is inclined slightly downward from its peripheral edge to its center portion to retrieve any condensation formed on the top cover as a result of hot outlet vapors. The top cover may also contain a handle connected to its exterior and is typically positioned within the center portion.

The present invention also provides a means for releasably locking the top cover onto the cooker. In the preferred embodiment, the locking means encompasses two tabs coupled to the top cover and two locking bases coupled to the container. The tabs are oppositely positioned and integral with the exterior of the top cover. Similarly, the locking bases are oppositely positioned and integral with both the container side wall and skirt rim. Each locking base has a slot member pivotally connected to it. Each slot member has a slot for receiving and engaging of the top cover one tabs. Through an upward motion of the slot member, the tab is locked into place within the slot. Other looking mechanisms can be used as long as the top cover remains secured to the cooker during microwave processing.

In the preferred embodiment, the top cover and inner lid have the same outer diameter and each have a plurality of vent holes or apertures. Both the top cover and inner lid are positioned within container and each have a skirted edge. The skirted edges form an enclosure within the container member, specifically designed to obstruct and contain escaping food particles.

The combination of downwardly and upwardly baffle ribs creates a series of food particle obstructions and a tortuous vapor flow. The baffle ribs allow vapors to freely flow from the container, yet hinder the passage of food particles. This design allows foods to safely steam and boil at atmospheric pressure without creating a mess. Both the inner lid and top cover have ventilation apertures which prevent pressure build up, and food is cooked at a constant, essentially atmospheric, pressure. The unique lid construction is designed to alleviate pressure build up and hinder the spattering and overflow of food within the oven.

The cooker continuously relieves pressure build up during the cooking process. Pressure equilibrium is maintained without stopping the microwave oven. The inner lid and top cover baffle rib construction obstructs the flow of food particles out of the food container as vapor ventilates. A tortuous vapor flow is created. The top cover is partially inclined downward to further deflect dissipation of food within the oven. The microwave cooker specifically features a locking top cover to prevent the overflow or spillage of large amounts of food.

The cooker is constructed of material appropriate for use in a microwave oven, or alternatively, for use in both conventional oven and microwave. The cooker may be any one of a variety of shapes and/or sizes. However, in the preferred embodiment, the food container of the subject invention is substantially cylindrical shaped.

The subject invention is illustrated in a single preferred embodiment. This embodiment is particularly suited for the preparation of rice and pasta and other foods such as oatmeal that require boiling or steaming. However, the present invention may be used for baking, reheating and defrosting foods without the need for special packaging.

It is an object and feature of the present invention is to provide a microwave cooker that continuously relieves pressure build up while obstructing food particles from entering into the oven.

It is a further object and feature of the present invention to provide a microwave cooker that prevents food overflow and spillage.

Another object and feature of the present invention is to provide a microwave cooker which hinders the spattering of food particles while boiling or steaming food in a microwave oven.

Another object and feature of the present invention is to provide a microwave cooker that cooks a variety of foods and minimizes the clean up of the microwave oven.

These and other objects and features of the invention will be readily apparent from the accompanying drawings and detailed description of the preferred embodiment.

DETAILED DESCRIPTION OF THE PREFERRED EMBODIMENTS

FIGS. 1 to 4 represent the preferred embodiment of the present invention designated generally as the microwave cooker.

Figure 1:
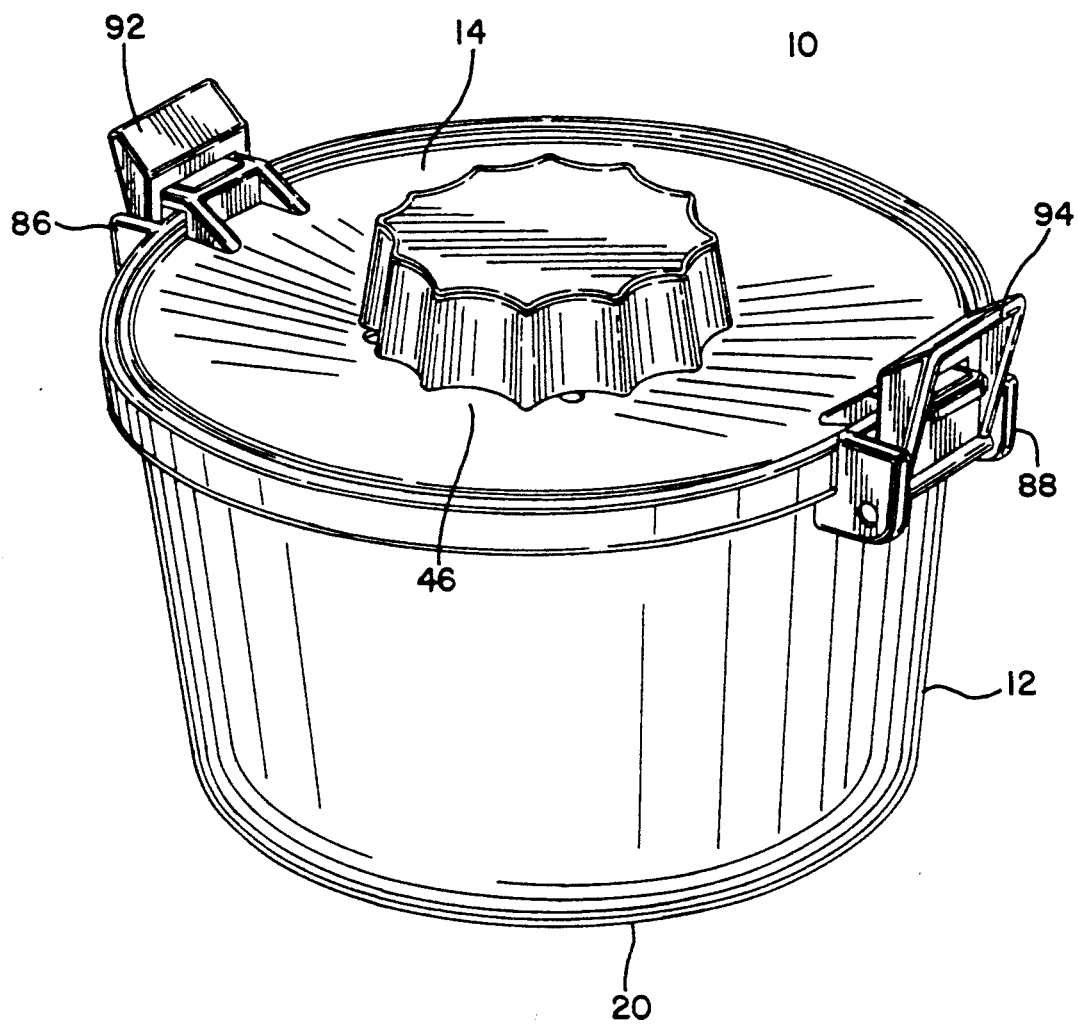
FIG. 1 is a perspective view of the microwave cooker.
Figure 2:
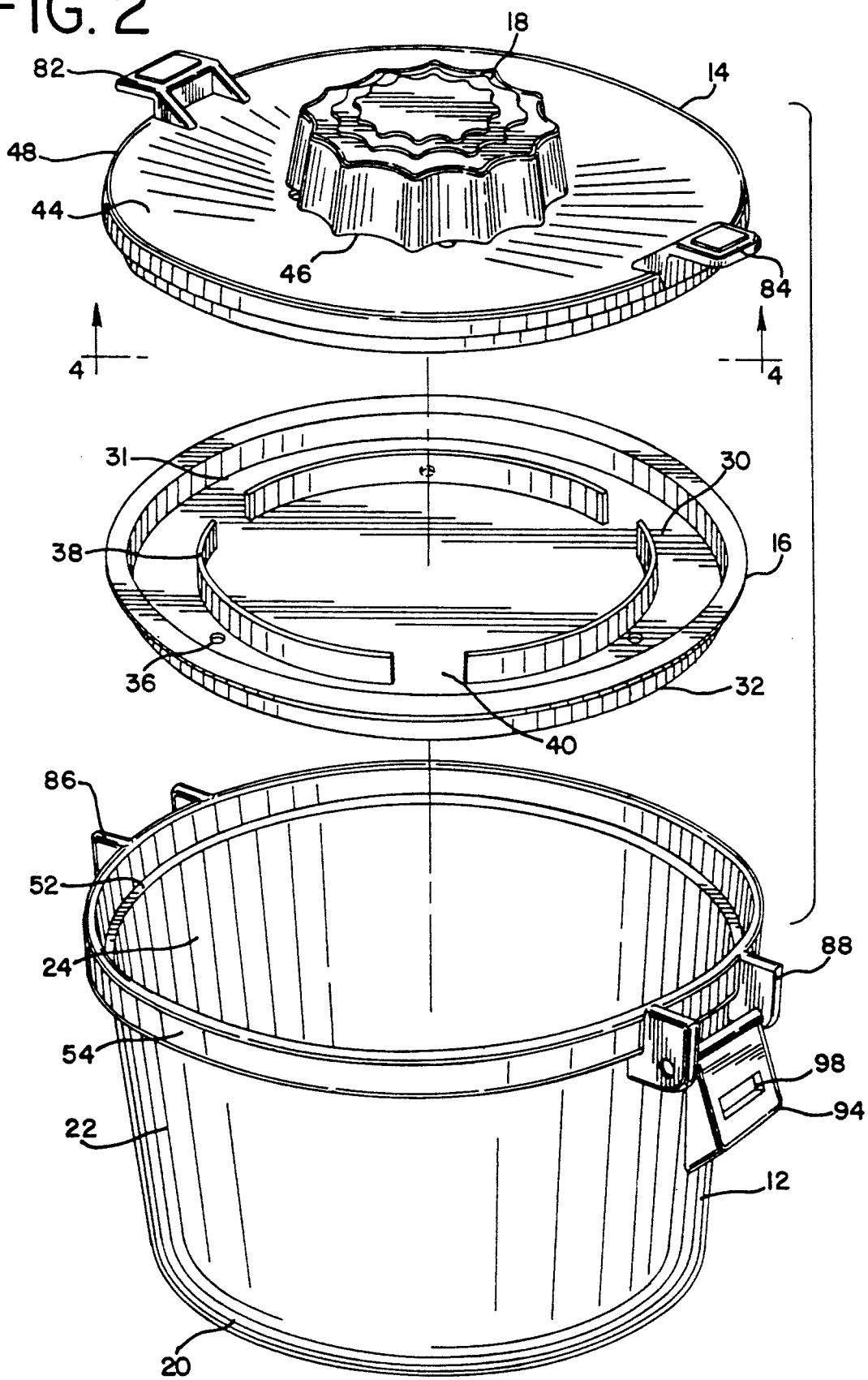
FIG. 2 is an exploded view of the microwave cooker highlighting the arrangement of the top cover, inner lid and container.

Referring now specifically to FIGS. 1 and 2, the microwave cooker 10 comprises a cooking container member 12, a top cover 14, an inner lid 16, formations 52 and 54 for supporting the inner lid 16 within the cooking container member 12 and a means for releasably locking the top cover 14 onto the cooker 10. The cooking container member 12 has an open top 24 and at least one side wall 22 substantially perpendicular to the open top 24.

The inner lid 16 is removable, yet remains fixed between the cooking container member 12 and the top cover 14 during the cooking process. The inner lid 16 has a top 30 and a bottom side 32 and peripheral edge 34 located along the perimeter of the lid 16. It also contains at least one vent aperture 36. At least one upwardly extending baffle rib 38 resides within the top side 30 of the inner lid 16, each upwardly extending baffle rib 38 having at least one gap 40 for vapor flow.

Figure 4:
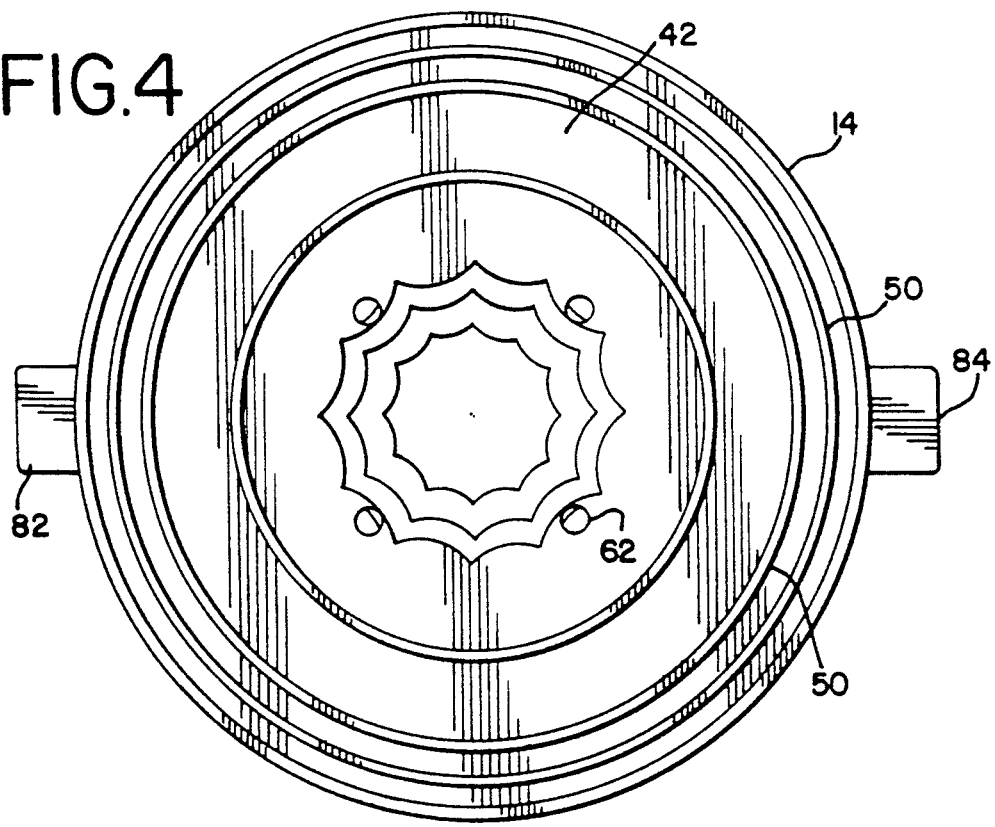
FIG. 4 is a bottom plan of the top cover highlighting the downwardly extending ridges and oppositely placed locking tabs.

After the food contents are placed within the container member 12, the top cover 14 is positioned over the inner lid 16 and secured into place. The top cover 14 has an interior side 42, an exterior side 44, a central portion 46, a peripheral edge 48 located along the perimeter of the top cover 14 and at least one vent hole (49). As shown in FIG. 4, the interior side 42 of the top cover 14 also has a plurality of downwardly extending baffle ribs 50 in a spaced relationship. The downwardly extending baffle ribs 50 are also in a spaced relationship with the upwardly extending baffle ribs 38 of the inner lid 16. In the preferred embodiment, this relationship is radial.

The central portion 46 of the top cover 14 is slightly downwardly inclined for deterrence against food particle release and to funnel condensate and boiled over food particles back into the food container 12. A handle 60 may be connected to the exterior side 44 of the top cover 14 and positioned within the center portion 46. In the preferred embodiment, the handle 60 is a knob.

The subject invention also comprises formations 16 for supporting the inner lid 16 within the cooker 10. In the preferred embodiment, the inner lid 16 is supported within the cooker 10 by an integral ledge 52 outwardly extending from the food container 12 and positioned at the open top 24. As shown in FIG. 2, the ledge 52 is further coupled to a skirt rim 54 upwardly extending from and integral with the ledge 52. The inner lid 14 is supported by the ledge 52, held into place by the skirt rim 54 and secured by the top cover 14.

In the preferred embodiment, the top cover 14 and inner lid 16 each have a plurality of vent holes or apertures 62 and 64 and each have a skirted edge 66 and 68. An integral lip 70 outwardly extends from the skirted edge 68 of the inner lid 16. The integral lip 70 extends to the peripheral edge 48 of the top cover 14. When the top cover 14 is placed over the lid 16, the skirt edge 66 of the top cover 14 rests upon integral lip 70 and an inner enclosure 75 is constructed. This enclosure 75 contains the upwardly and downwardly extending baffle ribs 38 and 50 of the inner lid 16 and top cover 14, respectively.

The subject invention is designed to create a tortuous flow of food vapors flowing through the enclosure 75 during the microwave cooking process. The baffle ribs 38 and 50 as contained within the enclosure obstruct and contain food particles. In addition, the baffle ribs 38 and 50 also strengthen the inner lid 16 and top cover 14 so they will not warp out of shape.

A means for releaseably locking the top cover 14 onto the microwave cooker 10 is also provided in order to prevent food overflow. In the preferred embodiment, the means for releasably locking the top cover is a locking mechanism 80. The locking mechanism 80 encompasses two tabs 82 and 84 coupled to the top cover 14 and two locking bases 86 and 88 coupled to the food container 12. The tabs 82 and 84 are oppositely positioned and integral with the exterior of the top cover 14. As shown in FIG. 2, the locking bases 86 and 88 are also oppositely positioned and integral with both the container side wall 22 and the skirt rim 54. Each locking base 86 and 88 is pivotally connected to a slot member 92 and 94. Each slot member 92 and 94 has a slot 96 and 98 for receiving and engaging one tab 82 and 84.

Figure 3:
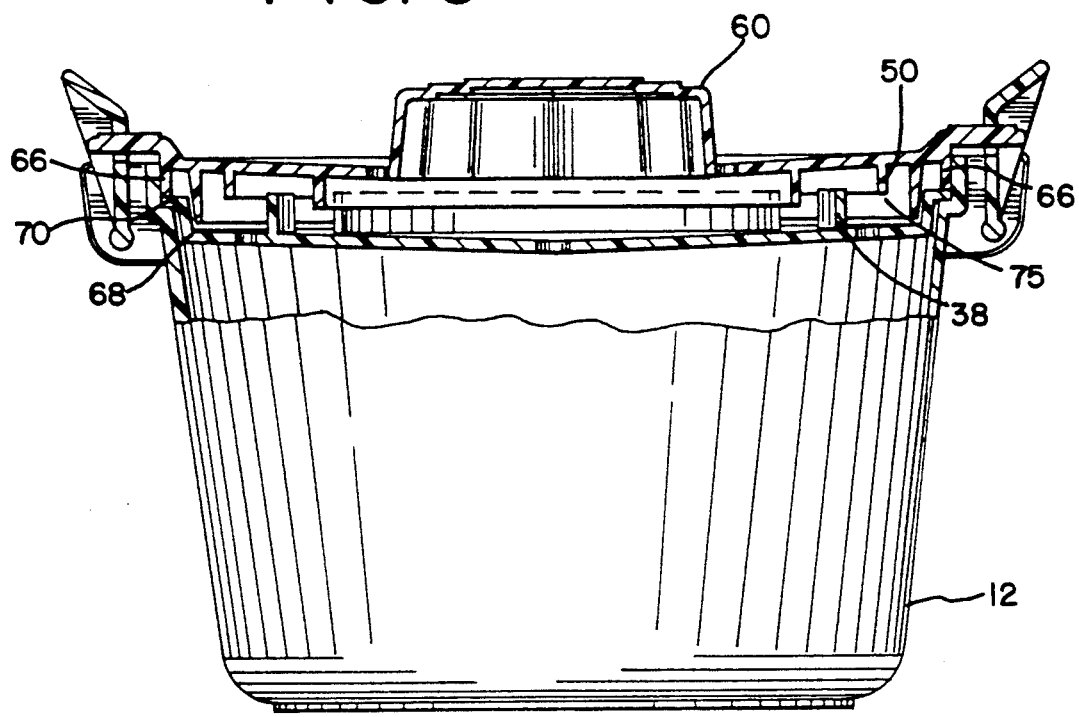
FIG. 3 is a side elevational side view of the microwave cooker partially in section.

As clearly depicted in FIGS. 1 and 3, the tabs 82 and 84 are locked into place within the slots 96 and 98 by an upward motion of the slot members 92 and 94. The top cover 14 is released by depressing the slot member 92 and 94 pivoting the slot member on the locking base into a position shown in FIG. 2.

The foregoing detailed description has been given only by way of example and it will be understood by those skilled in the art that many modifications may be made in the structure of the illustrated and described preferred embodiment without departing from the spirit and scope of the invention as herein after claimed.

What is claimed is:

1. A microwave cooker comprising:
   a cooking container member adapted to hold food to be cooked, said container having at least one sidewall defining an open top;
   an inner lid member adapted to be inserted into the open top of said container member for closing the container member open top, said inner lid member having at least one upwardly extending baffle rib inwardly spaced from the perimeter of said inner lid member, said inner lid member having at least one vent hole for permitting steam to escape from the container during cooking and a peripheral edge;
   formations on at least one of said members for supporting said inner lid member in position within said container member adjacent said open top;
   a top cover adapted to overlie and cover said inner lid member and to define with said inner lid member a space therebetween for the accumulation of steam and boiling-over food, said top cover having a downwardly dished central portion and at least one downwardly depending baffle rib spaced inwardly from the outer edges of said top cover and having at least one vent hole in said central portion, said top cover rib being in a spaced relationship to said inner lid baffle rib, and said top cover vent hole being laterally spaced from said inner lid member vent hole when said top cover is positioned in overlying relationship with said inner lid member; and
   a means for releasably locking said top cover to said cooking container member, whereby said inner lid member and said top cover will remain in place during cooking and effluent steam will have a tortuous path between said vent holes in said inner lid member and in said top cover.

2. The microwave cooker of claim 1 wherein said formations for supporting said inner lid member comprise an inner ledge outwardly extending from said sidewall of said cooking container, an outwardly extending lip on said inner lid member for engaging said ledge, said lip outwardly extending from said peripheral edge of said inside lip.

3. The microwave cooker of claim 1 wherein said means for releaseably locking said top cover comprises two locking tabs coupled to said exterior side of said top cover, two locking bases coupled to said food container and two slot members each having a slot for receiving and securing said tab, each said slot member pivotally connected to one said base.

4. The microwave cooker of claim 3 wherein said tabs and said locking bases are oppositely spaced.

5. The microwave cooker of claim 1 wherein said cooker further comprises a handle coupled to said exterior side of said top cover.

6. The microwave cooker of claim 5 wherein said handle is a knob located in said central portion of said top cover.

7. A microwave cooker of claim 1 wherein said sidewall is cylindrically shaped.

8. A microwave cooker of claim 7 wherein said downwardly and said upwardly extending baffle ribs are radially spaced.

9. A microwave cooker of claim 2 wherein said top cover further comprises a top cover skirt edge downwardly extending from said top cover peripheral edge, said inner lid member further comprises a lid skirt edge upwardly extending from said inner lid member peripheral edge and integral with said outwardly extending lip, said top cover skirt edge and said outwardly extending lip being contiguous to form an inner enclosure.

* * * * *